UNITED STATES PATENT OFFICE.

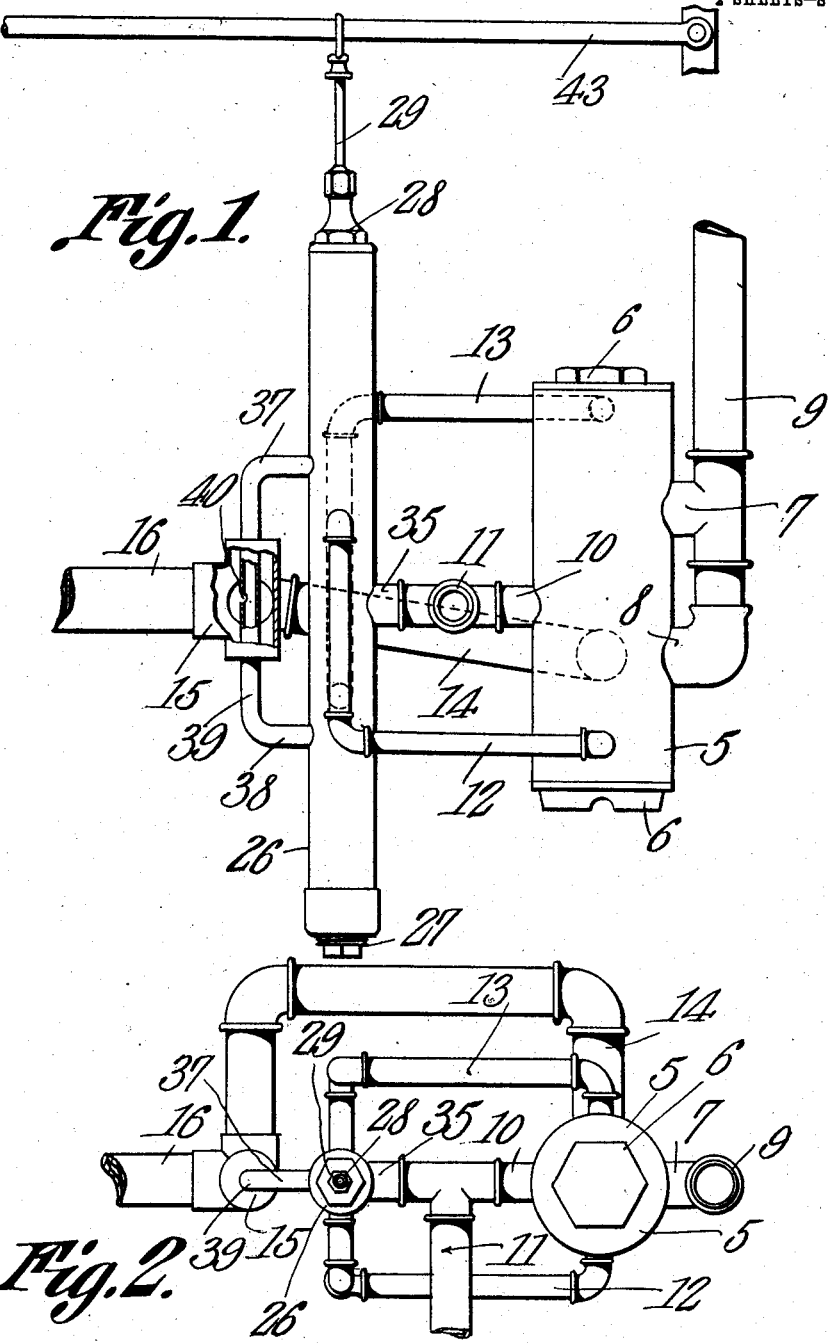

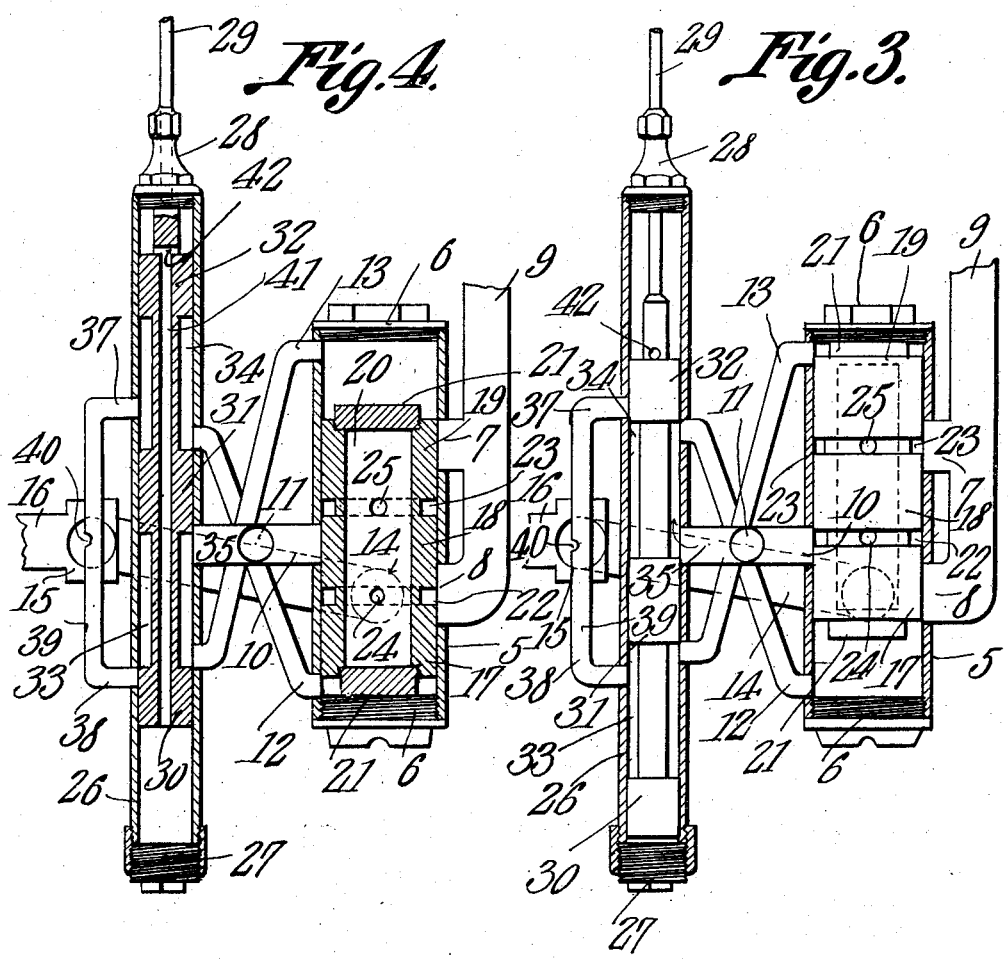

FRANK C. MERREGE, OF MARINE CITY, MICHIGAN, ASSIGNOR TO SAFETY LIGHT & HEATING COMPANY OF AMERICA, OF DETROIT, MICHIGAN.

VALVE MECHANISM.

992,729.  Specification of Letters Patent.  Patented May 16, 1911.

Application filed April 14, 1910. Serial No. 555,321.

*To all whom it may concern:*

Be it known that I, FRANK C. MERREGE, a citizen of the United States, residing at Marine City, in the county of St. Clair and State of Michigan, have invented a new and useful Valve Mechanism, of which the following is a specification.

The valve mechanism which is the subject of the present invention is designed for controlling the admission and exhaust of motive fluid in hydraulic apparatus such as the raising and lowering mechanism employed in connection with the carbureter disclosed in my Patent No. 759,539, dated July 27, 1903.

It is the object of the invention to provide a valve mechanism which is simple in construction, and reliable in operation, a main fluid-pressure actuated valve being provided which is controlled by an auxiliary valve, and the last mentioned valve being controlled by the part to be raised and lowered.

In order that the invention may be better understood, reference is had to the accompanying drawings forming a part of this specification, in which drawings, Figure 1 is an elevation of the valve mechanism. Fig. 2 is an end view. Figs. 3 and 4 are diagrammatic views, partly in section, showing the valve mechanism in different positions.

Referring more particularly to the drawing, 5 denotes the casing of the main valve, said casing being cylindrical, and having its ends closed by screw plugs 6. The casing is entered on one side by pipes 7 and 8, respectively, branching from a pipe 9 which leads to the hydraulic cylinder or other fluid-pressure apparatus, and which pipe carries the motive fluid to and from said apparatus. Diametrically opposite the points at which the pipes 7 and 8 enter the cylinder 5, said cylinder is entered by a supply pipe 10 branching off from a pipe 11 which leads to the water main or other source of fluid-pressure. The cylinder 5 is also entered, close to its ends, by pipes 12 and 13 respectively, the function of which will be presently described. In the plane of the point at which the pipe 8 enters the cylinder, the latter is entered by a pipe 14. The last mentioned pipe leads to and enters a casing 15, to which is connected a waste pipe 16 through which the exhaust is discharged.

In the cylinder 5 operates a reciprocating plunger having three heads, the latter being indicated at 17, 18 and 19 respectively. The plunger is hollow, the bore thereof being indicated at 20, and said bore being closed at its ends by plugs 21. The plunger heads fit snugly in the bore of the cylinder, and in the plane of the space between said heads, the plunger has ports which open at one end into the bore 20, and at their opposite ends into said spaces. The spaces between the plunger heads form annular grooves, said grooves being indicated at 22 and 23 respectively. The ports which open into the groove 22 are indicated at 24, and the ports which open into the groove 23 are indicated at 25.

At 26 is indicated the casing of the valve which controls the flow of the motive fluid to the cylinder 5. This casing is also cylindrical, and has one of its ends closed by a screw plug 27. The opposite end of the cylinder is provided with a stuffing box 28 through which passes the rod 29 of a valve working in the cylinder. This valve is a plunger having three heads indicated at 30, 31 and 32 respectively, said heads being spaced, and the spaces between said heads forming annular grooves 33 and 34 respectively. The cylinder 26 is entered intermediate its ends by a pipe 35 branching from the pipe 11. The pipe 12 extends upwardly to, and enters the cylinder 26 at a point above the point of entrance of the pipe 35. The pipe 13 extends downwardly, and enters the cylinder 26 at a point below the point of entrance of the pipe 35. The cylinder 26 is also entered by the two ends 37 and 38 of a pipe 39 which extends into the casing 15, and has in said casing a port 40 opening thereinto. The pipes 37 and 38 enter the cylinder 26 diametrically opposite the point of entrance of the pipe 35, and also above and below the same respectively.

The plunger working in the cylinder 26 has a central longitudinal bore 41 opening at one end into the interior of the cylinder below the head 30, and at its other end into the interior of said cylinder above the head 32 through side ports 42. The plunger stem 29 will be connected to a lever 43 which is located in the path of abutments on the part to be elevated and lowered, so that when said abutments strike the lever, the plunger will be shifted in the cylinder 26. As already stated, the valve mechanism is designed for controlling the hydraulic cylinder employed for raising the air bell of a carbureter. The plunger working in the hydraulic cylinder is connected to the air bell, and abutments are carried by the latter. When the bell is descending, one of said abutments strikes the lever 43 at the end of the downward movement of the bell, so that the plunger carried by the stem 29 will be shifted in the cylinder 26 to a position to admit motive fluid into the hydraulic cylinder, for the purpose of elevating the plunger therein to raise the bell. At the end of the upward movement of the bell, the other abutment strikes the lever, and reverses the position of the plunger carried by the stem 29, whereupon the exhaust from the hydraulic cylinder takes place.

The operation of the valve mechanism is as follows: Assuming the air bell to be in lowered position, and to have moved the plunger in the cylinder 26 to the position shown in Fig. 3. In this position of the plunger, the groove 34 establishes communication between the pipes 35 and 12, and the fluid-pressure therefore flows from the pipe 35 into the groove 34, and by the way of the pipe 12 into the cylinder 5 below the head 17 of the plunger working therein. Said plunger has therefore been moved upwardly in the cylinder as shown in Fig. 3. In this position the groove 22 is in line with the entrance end of the pipe 10, and the groove 23 is in line with the entrance end of the pipe 7. The motive fluid therefore flows from the pipe 10 into the groove 22, and through the ports 24 into the bore 20 of the plunger, and out of said bore through the ports 25 into the groove 23, and thence into the pipe 7, and by the way of the pipe 9 to the hydraulic cylinder. The motive fluid which was in the clyinder 5 above the plunger head 19 when the plunger was moving upwardly as stated, flowed by the way of the pipe 13 into that portion of the cylinder 26 between the plunger heads 30 and 31, and thus passed by the way of the groove 33 into the pipe 38, and was discharged through the pipe 39 into the waste pipe 16. The plunger working in the cylinder 26 is so dimensioned that when it is admitting motive fluid to the lower end of the cylinder 5, the upper end of the latter cylinder exhausts into the groove 33. When the position of the plunger is reversed, motive fluid enters the upper end of the cylinder 5 by the way of the pipe 13, said pipe being in communication with the pipe 35 through the groove 33, and the lower end of the cylinder 5 then exhausting through the pipe 12 into the groove 34, said groove being now in a position in which it establishes communication between the pipe 12 and the pipe 37. When the air bell reaches the limit of its upward movement, the lever 43 is swung in a direction to place the plunger working in the cylinder 26 in the position shown in Fig. 4. Motive fluid now enters the upper end of the cylinder 5 by the way of the pipe 13, and the lower end of the cylinder exhausts through the pipe 12. When the plunger reaches the lower end of the cylinder 5, the groove 22 comes in line with the entrance end of the pipes 14 and 8. The groove 23 has also moved out of the plane of the entrance end of the pipe 7, thus shutting off the flow of motive fluid to the hydraulic cylinder, and the latter now exhausts by the way of the pipes 9 and 8 into the groove 22, and by the way of the pipe 14 into the casing 15, and thence to the waste pipe 16. After the hydraulic cylinder has exhausted, and the air bell reaches the limit of its downward movement, the first described operation is repeated, and the parts again assume the position shown in Fig. 3, to again admit motive fluid to the hydraulic cylinder. The function of the bore 41 is to permit any water which may accumulate at the ends of the plunger, to pass from one end of the cylinder 26 to the other, and thus prevent a back pressure.

What is claimed is:

A valve mechanism for fluid pressure apparatus comprising a main valve consisting of a cylinder having motive fluid inlets at its ends and intermediate said ends, two motive fluid passages leading from a common pipe into said cylinder at points midway of the three inlets, and an exhaust opening into said cylinder opposite one of said passages; and a plunger therein having a hollow body and closed ends, two annular grooves spaced to communicate with the central inlet and either passage, and ports opening from said grooves into the bore of the plunger; combined with mechanism for shifting the flow of the motive fluid from one endmost inlet to the other and simultaneously connecting the opposite inlet with the exhaust.

In testimony that I claim the foregoing as my own, I have hereto affixed my signature in the presence of two witnesses.

FRANK C. MERREGE.

Witnesses:
W. L. WHITE,
JOHN STAFFORD WHITE.

---

Copies of this patent may be obtained for five cents each, by addressing the "Commissioner of Patents, Washington, D. C."